United States Patent
Keesee

[15] 3,698,165
[45] Oct. 17, 1972

[54] EDGER FOR LAWN MOWER

[72] Inventor: Ernest W. Keesee, 3767 South Court Street, Montgomery, Ala. 36105

[22] Filed: March 3, 1971

[21] Appl. No.: 120,552

[52] U.S. Cl. ..................................56/11.4, 56/13.7
[51] Int. Cl. ...............................................A01d 35/26
[58] Field of Search............56/10.8, 11.1, 11.2, 11.3, 56/11.4, 11.5, 11.6, 12.7, 13.7, 16.9, 16.7, 17.1, 17.2, 17.5

[56] References Cited

UNITED STATES PATENTS

| | | | |
|---|---|---|---|
| 3,192,693 | 7/1965 | Bergeson | 56/13.7 |
| 2,771,730 | 11/1956 | True | 56/11.6 |
| 3,079,743 | 3/1963 | Egley | 56/11.6 |
| 3,490,213 | 1/1970 | Pinto | 56/16.9 |
| 2,719,398 | 10/1955 | Hutchens | 56/16.9 |
| 2,643,503 | 6/1953 | Noyes | 56/13.7 |
| 2,954,658 | 10/1960 | Bruce | 56/17.1 |
| 2,947,132 | 8/1960 | Shaw | 56/11.1 |
| 2,862,344 | 12/1958 | Caudle, Sr. et al. | 56/16.9 |
| 3,304,700 | 2/1967 | Barber | 56/11.6 |
| 3,421,300 | 1/1969 | Rhodes | 56/10.8 |

*Primary Examiner*—Russell R. Kinsey
*Attorney*—Jennings, Carter & Thompson

[57] ABSTRACT

An edger support is mounted on a mower housing for pivotal movement selectively to an upper inoperative position to a lower operative position. An edger blade is carried by the support and operatively connected to a power unit in response to movement of support to lower operative position and disconnected from power unit in response to movement to upper inoperative position. Releasable means holds edger support in selected positions and releasable means connects power unit to wheels of mower.

2 Claims, 4 Drawing Figures

INVENTOR.
Ernest W. Keesee
BY
Jennings, Carter & Thompson
Attorneys

INVENTOR.
Ernest W. Keesee
BY
Jennings, Carter & Thompson
Attorneys

EDGER FOR LAWN MOWER

BACKGROUND OF THE INVENTION

This invention relates to an edger for a power lawn mower and more particularly to such an edger which is adapted to move selectively from an upper inoperative position to a lower operative position and includes improved means for locking the edger out of operative position when not in use as an edger.

Heretofore in the art to which my invention relates, difficulties have been encountered in cutting grass along the edges of side walks, streets and the like due to the fact that hand operated units are difficult to manipulate and are also time consuming. While power units have been devised for trimming along the edges of sidewalks and the like, such units are expensive since they have self contained power units and support means for the edger.

BRIEF SUMMARY OF THE INVENTION

In accordance with my present invention, I provide an edger support which is mounted at one side of a conventional type lawn mower and is adapted for movement selectively from an upper inoperative position to a lower operative position. The power means for the edger blade is energized upon movement of the support to a lower position and is disengaged upon movement of the support to an upper position. Releasable means is provided for holding the support at selected elevations and releasable means connects the power unit of the lawn mower to the wheels of the mower.

DESCRIPTION OF THE DRAWINGS

Apparatus embodying features of my invention is illustrated in the accompanying drawings, forming a part of this application, in which.

Figure 2:
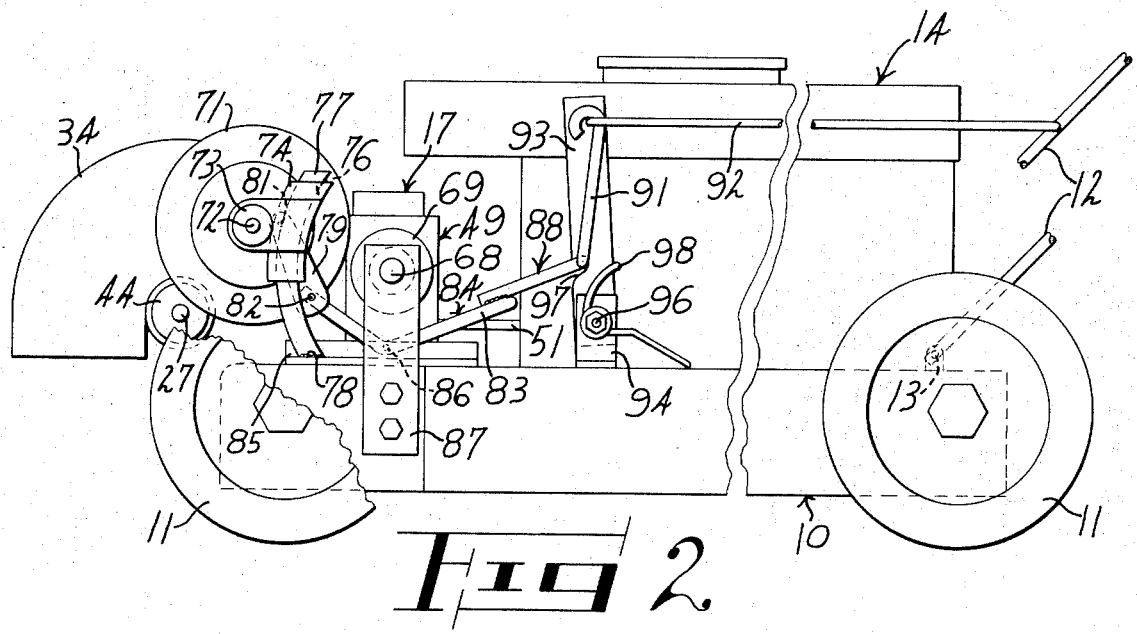
FIG. 2 is a side elevational view, partly broken away, showing the opposite side of the lawn mower.
Figure 1:
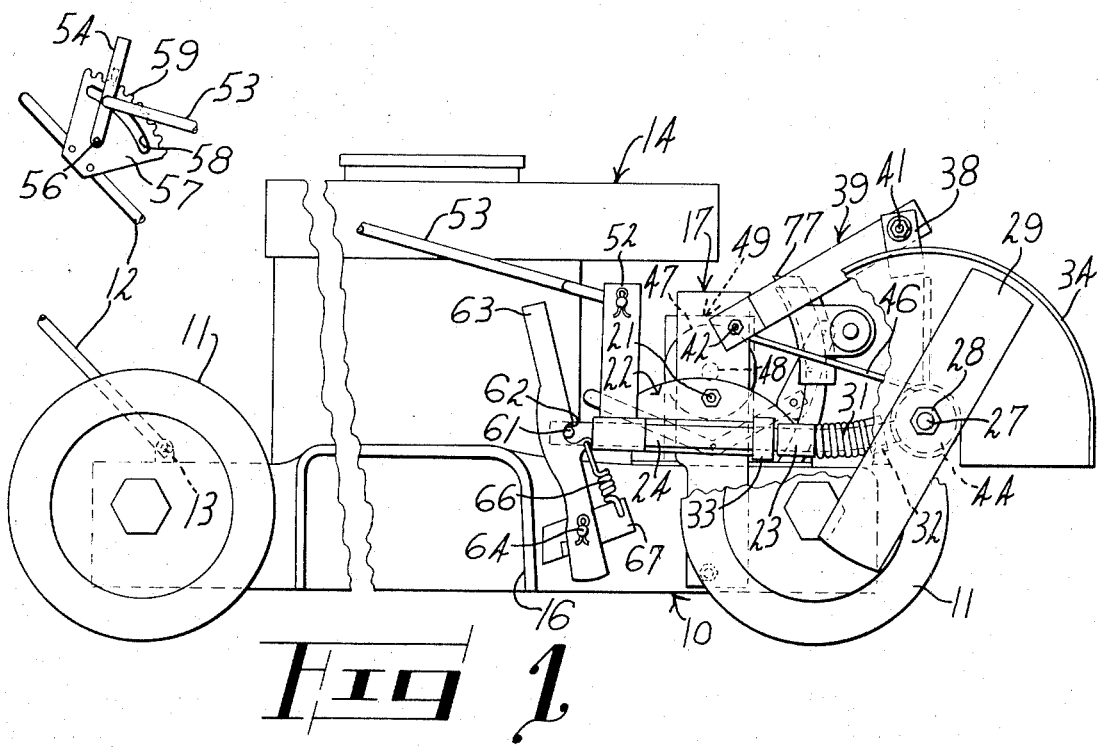
FIG. 1 is a side elevational view, partly broken away, showing the edger unit in the upper inoperative position.

Referring now to the drawings for a better understanding of my invention, I show a lawn mower housing 10 which is supported by wheels 11. A handle unit 12 is connected to a rear portion of the housing 10 by suitable pivot pins 13, as shown in FIGS. 1 and 2. A conventional type power unit indicated generally at 14, is mounted on the housing 10 for rotating the usual rotary blade, not shown. Also, the housing 10 is provided with a discharge opening or chute 16, as shown in FIG. 1, for discharging cut grass.

Figure 4:
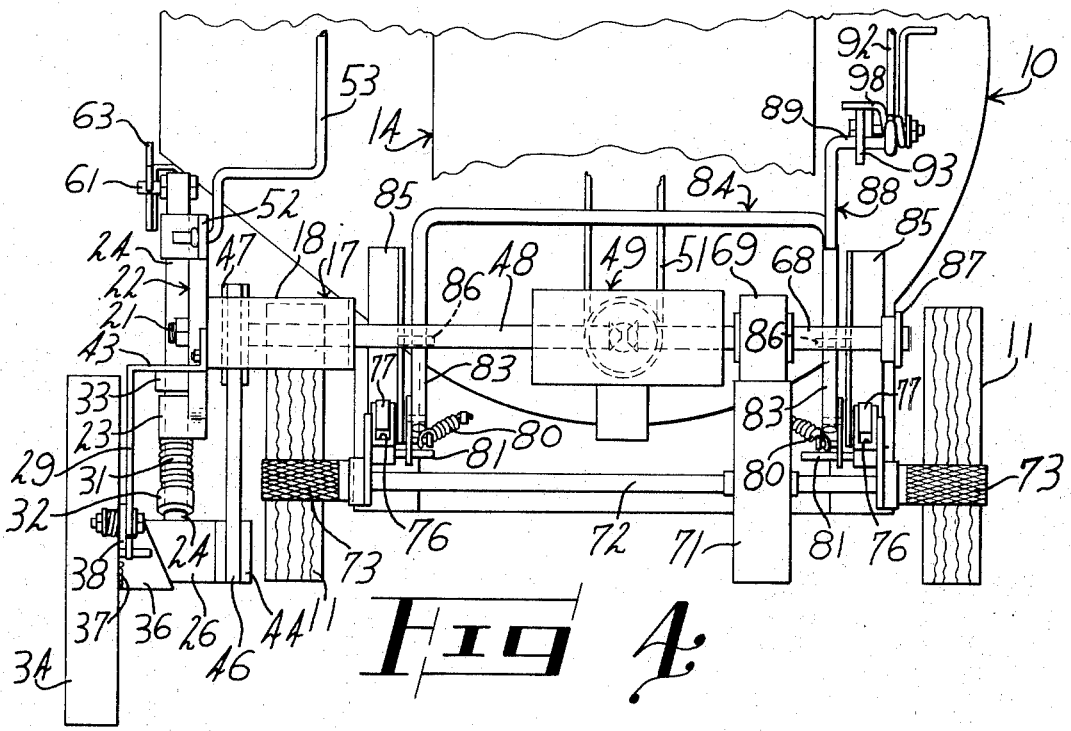
FIG. 4 is a top plan view showing the forward portion of a lawn mower having my improved apparatus associated therewith.
Figure 3:
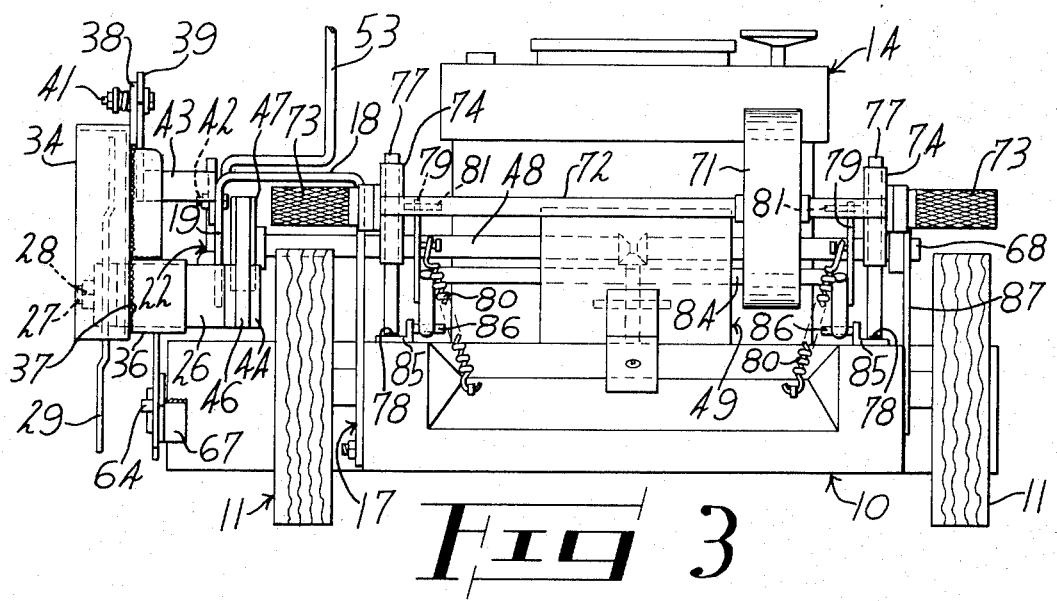
FIG. 3 is a front elevational view, partly broken away.

Mounted on the side of the housing 10 adjacent the forward portion thereof is a support bracket 17 which extends laterally at its upper end as at 18 and then downwardly as at 19, as shown in FIG. 3. Pivotally connected to the lower end of the downwardly extending portion 19 by a pivot pin 21 is an edger support indicated generally at 22. A bearing member 23 is secured rigidly to the support 22 and slidably receives an elongated rod-like member 24. Secured rigidly to the forward end of the rod 24 is a transverse bearing member 26. Mounted for rotation in the bearing member 26 is a horizontal shaft 27. Secured rigidly to the shaft 27 by a lock nut 28 is a cutter blade 29 which is adapted to rotate in a vertical plane. As shown in FIGS. 1 and 4, a compression spring 31 surrounds the shaft-like member 24 between the bearing 23 and a collar 32 which is secured to the shaft 24 adjacent the bearing member 26. A collar 33 is secured to the member 24 at the opposite side of the bearing member 23 from the spring 31 to limit forward movement of the rod-like member 24. The spring 31 thus exerts a force in a direction to move the rod-like member 24 forwardly along the bearing member 23.

An arcuate guard member 34 encases the upper portion of the rotary blade 29 and is mounted for rotation on the bearing member 26 by a sleeve-like member 36 which is secured to the guard member 34 by suitable means, such as by welding at 37.

An upstanding bracket 38 is carried by the guard member 34, as shown. One end of a link 39 is pivotally connected to the bracket 38 by a pivot pin 41 while the other end of the link 39 is pivotally connected by a pivot pin 42 to the depending leg 19 of the support member 17. It will be noted that the link 39 is provided with a laterally extending portion 43, as shown in FIG. 3.

Mounted on the shaft 27 is a pulley 44 which is connected by a drive belt 46 to a pulley 47 which in turn is mounted non-rotatably on a drive shaft 48. The drive shaft 48 is connected by a transmission unit 49 to a drive belt 51 which in turn is connected to the power shaft of the lawn mower power unit 14. In view of the fact that such power units are of a conventional type, no further description thereof is deemed necessary.

Secured rigidly to the elongated rod-like member 24 is an upstanding bracket 52. Pivotally connected to the upper end of the bracket 52 is the lower end of an elongated actuating rod 53 which extends upwardly and rearwardly to a point adjacent the upper end of the handle unit 12 for the lawn mower. The upper end of the actuating rod 53 is pivotally connected to an actuating arm 54 which is pivotally connected as at 56 to an outwardly projecting bracket 57 carried by the lawn mower handle 12. An arcuate recess 58 is provided in the bracket 57 for receiving the upper end of the actuating rod 53 and suitable, releasable retaining elements 59 are carried by the bracket 57 for holding the elongated actuating member 53 at selected positions whereby the edger support 22 is in turn held at selected elevations.

The rear end of the elongated rod-like member 24 carries a laterally projecting pin 61 which is adapted to engage a forwardly opening recess 62 provided in an upstanding arm 63. The lower end of the arm 63 is pivotally connected by a pin 64 to a supporting bracket 67 which in turn is secured to the housing 10. Upon rearward movement of the upper end of the member 63, the lateral pin 61 is released to thus permit free movement of the edger support 22 and its guard member 34, which is controlled by the actuating rod 53. A tension spring 66 is interposed between the arm 63 and the stationary bracket 67 whereby the upper end of the arm 63 is urged forwardly into engagement with the pin 61.

As clearly shown in FIG. 1, the pivot pin 21 for the edger support 22 is located below and in spaced relation to the drive shaft 48 whereby upon movement of the shaft 27 to a lower operative position, the belt 46 is tightened to thus connect the shaft 27 in driving relation with the shaft 48 through the belt 46. On the other hand, upon movement of the shaft 27 to the upper, inoperative position, the belt 46 is loosened relative to the pulleys 44 and 47 whereby no rotary motion is imparted to the edger blade 29. Accordingly, the edger blade 29 only rotates while the shaft 27 and the guard member 34 are moved to the lower operative position.

Operatively connected to the transmission unit 49 is a second drive shaft 68, supported by bracket 87, which carries a friction roller 69 which in turn is in alignment with a second friction roller 71 carried by a driven shaft 72. Wheel engaging members 73 are provided adjacent each end of the shaft 72 in position to engage the subjacent wheels 11 while the shaft 72 is in a lower operative position. Upon upward movement of shaft 72, the members 73 move out of engagement with the wheels 11, as shown in FIG. 3. The wheel engaging members 73 are provided with a knurled surface to thus provide for friction engagement with the outer surface of the wheels 11 in a manner well understood in the art to which my invention relates. The shaft 72 is supported by upstanding support brackets 74 which are provided with arcuate passageways 76 therein for slidably receiving upstanding support brackets 77 which are secured at their lower ends to the lawn mower housing 10, such as by welding at 78. The upstanding brackets 77 are also arcuate in shape corresponding to the shape of the passageway 76 whereby the upper portion of the support brackets 77 extend upwardly and rearwardly while the lower portions thereof extend downwardly and rearwardly, as shown in FIG. 2.

Depending links 79 are secured to each of the support brackets 74 by pins 81. The lower ends of the links 79 are pivotally connected by pins 82 to the forward ends of leg members 83 of a U-shaped bracket 84. Each of the legs 83 is pivotally connected by a pivot pin 86 to support brackets 85 carried by the housing 10. The U-shaped bracket 84 is secured rigidly to a rearwardly and upwardly extending actuating member 88 which extends laterally as at 89 and then upwardly as at 91. The upper end of the member 88 is pivotally connected to the forward end of a flexible actuating member 92. The rear end of the flexible member 92 is connected to the handle 12, as shown. Accordingly, upon depressing the flexible connecting member 92, the upper end of the member 91 is moved rearwardly to thus pivot the U-shaped bracket 84 about the pivot pins 86 whereupon the support members 74 and the shaft 72 are moved to an upper position out of engagement with the wheels 11. The links 79 are connected to the housing 10 by tension springs 80 whereby the links are urged forward.

The lower end of an upstanding arm 93 is pivotally connected to a bracket 94 by a pivot pin 96, as shown in FIG. 2. A forwardly opening recess 97 is provided in the arm 93 for receiving the laterally extending portion 89 of the member 88 to thus lock the member 88 in the position shown in FIG. 2, whereby the wheel engaging members 73 are held out of engagement with the wheels 11. A suitable spring unit 98 urges the arm 93 forwardly into engagement with the laterally extending member 89, as shown.

Upon release of the arm 93, the springs 80, the weight of the shaft 72, roller 71 and the mechanism associated therewith exert a downward force whereby the U-shaped member 84 pivots about the pivot pins 86 to thus move the support brackets 74 downwardly in an arcuate path toward the friction roller 69. As the shaft 72 moves downwardly, the wheel engaging members 73 engage the outer surfaces of the wheels 11 to thus propel the lawn mower. By providing the arcuate support brackets 74 which move relative to the arcuate support members 77, the friction roller 71 moves into positive engagement with the friction roller 69 upon release of the arm 93 and forward movement of the handle.

The flexible member 92 is of a length whereby upon rearward movement of the handle unit 12, the U-shaped bracket 84 is pivoted about pivot pins 86 an angular distance to move the friction roller 71 out of engagement with friction roller 69, whereupon the wheel engaging members 73 are out of engagement with the wheels 11 while the handle 12 is released or moved rearwardly. That is, the weight of the handle 12 is such that it moves the flexible member 92 rearwardly upon release of the handle unit 12 by the operator whereby the drive to the wheels 11 is stopped immediately upon release of the handle. This is a safety feature to prevent the lawn mower from moving at any time the operator releases the handle unit 12.

From the foregoing description, the operation of my improved apparatus will be readily understood. To propel the mower forward, the arm 93 is moved rearwardly to thus release the lateral member 89 from the recess 97 whereupon the U-shaped bracket 84 is free to pivot in a direction to move the support brackets 74 and the shaft 72 downwardly upon forward movement of the handle unit 12. Accordingly, as the operator moves the handle 12 forward, the wheels 11 are driven by the wheel engaging members 73. In the event the operator accidentally releases the handle 12 or at any time he desires to stop movement of the lawn mower he may release the handle 12 whereupon the drive to the wheels 11 is stopped.

To operate the edger unit, the release arm 63 is moved rearwardly to thus release pin 61 from recess 62 whereupon the edger unit is then controlled by the elongated actuating member 53 which is held in selected positions by the control arm 54. As the control arm 54 is moved forwardly, the edger support 22 pivots downwardly and forwardly about pivot pin 21 whereupon the belt 46 is tightened due to the fact that the pivot pin 21 is located in spaced relation and below the shaft 48 for pulley 47. Accordingly, upon movement of the edger unit to lower operative position, the blade 29 commences to rotate in the direction of the arrow whereby the lower portion of the blade moves forward to throw any debris, such as rocks, bits of metal and the like forwardly rather than throwing the same rearwardly toward the operator. Also, the forward movement of the lower portion of the rotary blade 29 causes the edger unit to be lifted in the event the blade contacts a solid surface, such as a sidewalk, large rock or the like, thus preventing damage to the edger unit. To move the edger out of the operative position, the arm 54 is moved rearwardly to thus move the actuating member 53 rearwardly whereupon the edger support 22 is pivoted about pivot pin 21 to the upper position whereupon the belt 46 is loosened to thus stop further rotation of the cutter blade 29. To prevent accidental release of the edger unit while the mower is not employed as an edger, the arm 63 is moved forwardly whereupon the pin 61 engages the recess 62 to thus lock the edger unit in the raised, inoperative position.

From the foregoing, it will be seen that I have devised an improved edger for a lawn mower. By providing means for moving the edger selectively to an upper inoperative position to a lower operative position, together with means preventing rotation of the cutter blade while the edger unit is in the inoperative position, my apparatus is safe to operate and at the same time may be readily moved to operative position with a minimum of effort. Also, by providing lock means for securing the edger unit in the raised position while not employed as an edger, the edger unit does not interfere with the normal use of the lawn mower in cutting lawns. Furthermore, by providing positive means for driving the wheels 11 while the handle unit is moved forward and means to stop rotation of the wheels immediately upon rearward movement of the handle, my apparatus is not propelled while the operator is away from the handle unit. Furthermore, by providing the arcuate support members which engage the arcuate brackets, the shaft carrying the wheel engaging members is moved downwardly into positive engagement with its friction drive roller immediately upon forward movement of the handle unit.

While I have shown my invention in but one form, it will be obvious to those skilled in the art that it is not so limited, but is susceptible of various other changes and modifications without departing from the spirit thereof.

What I claim is:

1. The combination with a wheel supported lawn mower housing having a handle unit operatively connected thereto and a power unit mounted thereon:
  a. an edger support mounted adjacent one side of said lawn mower housing for pivotal movement in a vertical plane selectively to an upper inoperative position and to a lower operative position,
  b. an edger blade carried by said edger support and adapted for rotation in a vertical plane,
  c. means operatively connecting said edger blade in driving engagement with said power unit in response to pivotal movement of said edger support to said lower operative position and disconnecting said edger blade from driving engagement with said power unit in response to pivotal movement of said edger support to said upper inoperative position,
  d. means to move said edger support selectively to said upper inoperative position and said lower operative position,
  e. a drive shaft carried by said mower housing and operatively connected to said power unit,
  f. a first friction roller carried by said drive shaft,
  g. a driven shaft,
  h. wheel engaging members carried by said driven shaft in position to engage said wheels upon downward movement of said driven shaft,
  i. at least one movable support bracket connected to said driven shaft and movable selectively to a lower position with said wheel engaging members engaging said wheels and to an upper position with said wheel engaging members out of engagement with said wheels,
  j. a second friction roller carried by said driven shaft in position to engage said first friction roller upon movement of said driven shaft to said lower position, and
  k. means operatively connected to said movable support bracket for moving said movable support bracket selectively to said upper and lower positions.

2. The combination defined in claim 1 in which said movable support bracket is provided with an arcuate passageway therein with the upper portion of said passageway extending upwardly and rearwardly and the lower portion thereof extending downwardly and rearwardly and an upstanding arcuate support bracket corresponding to the shape of said passageway is carried by said mower housing and extends through said passageway.

* * * * *